United States Patent
Woo

(10) Patent No.: US 10,559,283 B2
(45) Date of Patent: Feb. 11, 2020

(54) AUTOMATED USER DEVICE DAMAGE REMEDIATION

(71) Applicant: PAYPAL, INC., San Jose, CA (US)

(72) Inventor: Titus Woo, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 232 days.

(21) Appl. No.: 15/464,088

(22) Filed: Mar. 20, 2017

(65) Prior Publication Data
US 2018/0268783 A1    Sep. 20, 2018

(51) Int. Cl.
| | | |
|---|---|---|
| G09G 5/373 | (2006.01) | |
| G09G 3/00 | (2006.01) | |
| G06F 3/0346 | (2013.01) | |
| G09G 5/14 | (2006.01) | |
| H04M 1/24 | (2006.01) | |

(52) U.S. Cl.
CPC ........... *G09G 5/373* (2013.01); *G06F 3/0346* (2013.01); *G09G 3/006* (2013.01); *G09G 5/14* (2013.01); *G09G 2330/12* (2013.01); *G09G 2340/0414* (2013.01); *G09G 2340/0421* (2013.01); *G09G 2340/0464* (2013.01); *G09G 2354/00* (2013.01); *H04M 1/24* (2013.01); *H04M 2250/22* (2013.01)

(58) Field of Classification Search
CPC .................. G09G 3/006; G09G 5/373; G09G 2340/0464; H04M 1/72519
See application file for complete search history.

(56) References Cited

U.S. PATENT DOCUMENTS

| | | | |
|---|---|---|---|
| 2011/0082616 A1* | 4/2011 | Small | B60K 35/00 701/31.4 |
| 2014/0253494 A1 | 9/2014 | Jiang et al. | |
| 2014/0320437 A1 | 10/2014 | Kang | |
| 2014/0333602 A1* | 11/2014 | Yang | G06F 1/3262 345/212 |
| 2015/0193074 A1 | 7/2015 | Cudak et al. | |
| 2017/0168630 A1* | 6/2017 | Khoshkava | G06F 1/163 |
| 2017/0205259 A1* | 7/2017 | Jang | A61B 5/02055 |
| 2017/0256051 A1* | 9/2017 | Dwivedi | G06T 7/11 |
| 2018/0181294 A1* | 6/2018 | Dare | G06F 3/04883 |
| 2018/0232506 A1* | 8/2018 | Kumar | G06F 21/32 |

FOREIGN PATENT DOCUMENTS

| | | | | |
|---|---|---|---|---|
| CN | 105068686 A | * | 11/2015 | |
| CN | 105117156 | | 12/2015 | |
| WO | WO-2016175396 A1 | * | 11/2016 | ........ H04M 1/72519 |

OTHER PUBLICATIONS

David Nield, What to Do When Your iPhone 7 Home Button Breaks, https://gizmodo.com/what-to-do-when-your-iphone-7-home-button-breaks-1788246623, Oct. 28, 2016.*

* cited by examiner

*Primary Examiner* — Stacy Khoo
(74) *Attorney, Agent, or Firm* — Haynes and Boone, LLP

(57) ABSTRACT

A system that self-remediates damage wherein the system recognizes an abnormal physical stress to the system, determines that the system has been damaged and remediates the damage by salvaging what is undamaged or providing alternative ways to handle the broken parts of the system.

20 Claims, 4 Drawing Sheets

AUTOMATED USER DEVICE DAMAGE REMEDIATION

TECHNICAL FIELD

The present disclosure generally relates to user device resilience and more specifically maintaining user device operability despite hardware failures.

BACKGROUND

Personal user devices, such as smartphones, have become indispensable to people's lives. People store important information such as work emails, contact information, and the like. Sometimes users accidentally damage their user device and are prevented from one or more functionalities of the device. For example, a button may get damaged or part of the screen may go dark. Some common causes of damage are dropping the user device, getting the user device wet, and ordinary wear and tear.

Individuals will often repair or buy replacements for their broken devices, but this will usually take time. People truly rely on their user devices and losing access to the user device, even temporarily can be a frustrating experience.

Applicant recognizes that it would be beneficial if user devices could detect trauma or breakage and take remediation measures to salvage as much functionality of the user devices as possible until the user can fix the device or replace the device.

Figure 1:
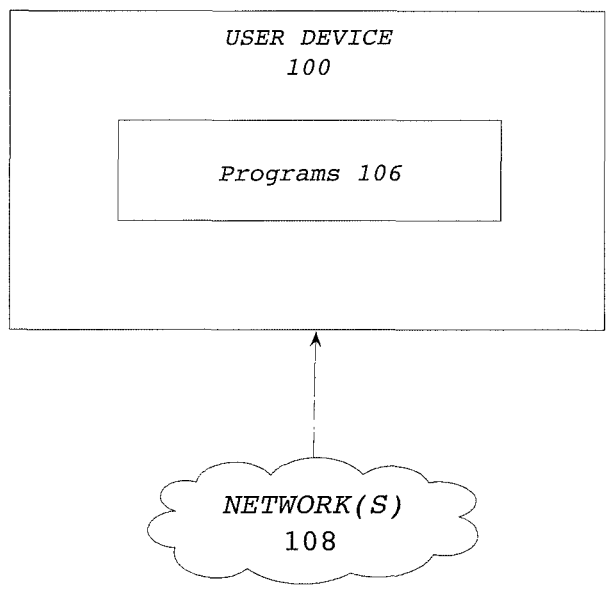
FIG. 1 is a block diagram of an exemplary computing system that is an example user device which may implement user device damage remediation.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some example embodiments, a user device is configured to detect and self-remediate damage. The user device may be able to detect based on the user device, what the user device self-diagnostic capabilities are and then appropriately detect and self-diagnose damage. For example, the user device may determine the type of touchscreen being used on the user device, such as whether it can detect force/pressure, capacitance, resistance, inductance, and/or the like. Furthermore, the user device may determine the technology used to detect the location of a touch activation on the touch screen. The user device may be able to determine this information based on the type of device. The user device may have a database of device information and/or hardware information for determining the type of touchscreen being used. This database may be updated from a third-party server. In some examples, the database may be held in a remote database that the user device may connect to request the information. The remote database may be regularly updated such that the user device does not have to maintain the information or get regularly updated.

Based on the hardware and device profile the user device may detect damage to the user device. The detection may use on or more methodologies, such as detecting abnormal sensor readings, abnormal usage patterns, user input, and/or the like. In some examples, damage can be detected based on sensor readings such as accelerometer readings indicating a traumatic event, touch screen readings indicating that a screen is cracked, display screen readings indicating that a pixel is not working correctly, and/or the like.

In some examples, damage can be detected based on abnormal usage patterns, such as when a physical button is not used in comparison to an average, lack of sound readings during certain applications, and/or the like.

In some examples, damage can be determined based on user input, such as taking out the battery of the user device, draining the battery of the user device, pressing buttons in a certain pattern, going to a setting menu and requesting diagnostics, and/or the like. In some examples, the user device may detect damage using more than one methodology, such as a combination of the above examples.

In some embodiments, the user device, having detecting damage, may determine a remediation procedure to maintain as much functionality of the user device as possible, whether it is take advantage of largest remaining, undamaged screen real estate of the user device, providing alternative buttons for broken buttons, adjusting brightness to overcome warp due to a cracked screen, and/or the like. The determination may be based on the type of device, the type of technology, the type of damage, and/or the like.

FIG. 1 illustrates, in block diagram format, an exemplary embodiment of a user device adapted for implementing self-damage or other damage remediation. As shown, a user device 100 may comprise or implement a plurality of software components that operate to perform various operations, process, and/or methodologies in accordance with the described embodiments.

User device 100 may be a laptop, a mobile computing device, a tablet, a PC, a wearable device, and/or any other computing device having computing and/or communications capabilities in accordance with the described embodiments. User device 100 may include a cellular telephone, smartphone, electronic wearable device (e.g., smart watch, virtual reality headset), or other similar mobile devices that a user may carry on or about his or her person and access readily.

User device 100 generally may provide one or more programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all the functionalities and/or processes discussed below.

As shown, user device 100 may be communicatively coupled via one or more networks 108. Data communications between user device 100 and other devices may be sent and received over one or more networks 108 such as the Internet, a WAN, a WWAN, a WLAN, a mobile telephone network, a landline telephone network, personal area network, as well as other suitable networks. For example, user device 100 may communicate with other devices over the Internet or other suitable WAN by sending and or receiving information via interaction with a web site, e-mail, IM session, and/or video messaging session. Any of a wide variety of suitable communication types between user device 100 and other devices may take place. In particular, wireless communications of any suitable form may take place between user device 100 and other devices, such as that which often occurs in the case of mobile phones or other personal and/or mobile devices.

Figure 2:
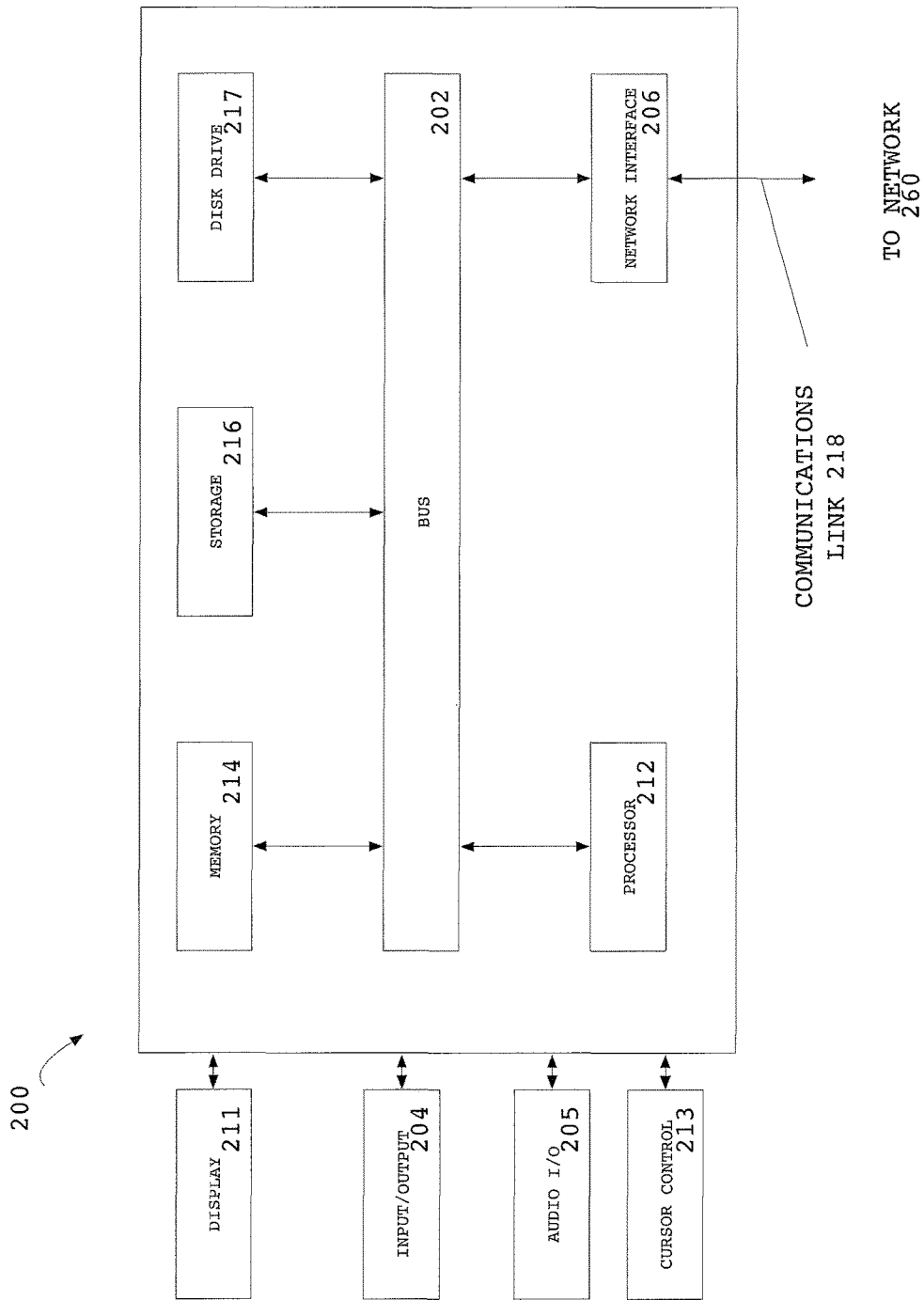
FIG. 2 is a block diagram of an exemplary computer system suitable for implementing the user device in FIG. 1.

FIG. 2 illustrates an exemplary computer system 200 in block diagram format suitable for use as a user device of FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network.

Additionally, as more and more devices become communication capable, such as new smart devices using wireless communication to report, track, message, relay information and so forth, these devices may be part of computer system 200. For example, windows, walls, and other objects may double as touchscreen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user devices or servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
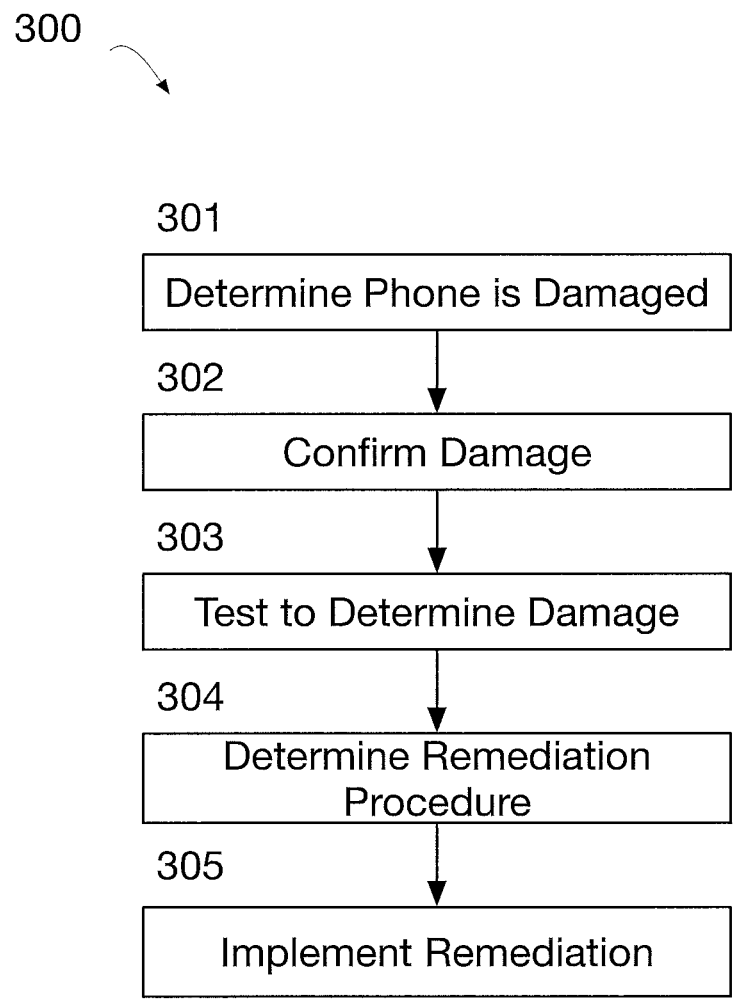
FIG. 3 illustrates a flow diagram of an example process for automatic device remediation.

FIG. 3 illustrates a flow diagram of an example process 300 for automatic device remediation. Process 300 may be implemented by a user device, such as user device 100 of FIG. 1. According to some embodiments, process 300 may include one or more operations 301-305, which may be implemented, at least in part, in the form of executable code stored on non-transitory, tangible, machine-readable media that, and when run on one or more processor, may cause a system and/or user device to perform one or more of the operation 301-305. Example process 300 is discussed herein as applied to a user device, however process 300 may also be applied to other systems and devices.

At operation 301, a user device may determine that damage remediation should be performed on the user device. The determination may be made in several ways.

In some examples, the user device may self-detect trauma, damage, and/or malfunction. For example, the user device may monitor an accelerometer for acceleration spikes or pressure sensors for pressure spikes indicative of trauma. For example, a phone being dropped on a hard surface or struck by a hard object will give readings that are abnormal in comparison to normal, non-damaging everyday use. In some examples, there may be a threshold accelerometer or pressure reading that indicates trauma to the user device. In some examples, the user device may be configured to detect large or quick differentials in movement speeds. In some example, the user device may be configured to find accelerometer patterns and/or pressure sensor patterns associated with a phone being dropped onto a hard surface. In some examples, the user device may be configured to detect accelerometer and/or pressure sensor readings that would cause damage to the user device. The threshold accelerometer and/or pressure sensor readings may be determined heuristically through accelerometer and/or pressure readings captured during drop tests and/or other device durability tests. In this manner, the user device would be able to self-detect damage to the device from a verity of different potentially damage causing events.

In some examples, the user device may detect trauma, damage, and/or malfunction through irregularities in sensor readings. For example, a screen that has been cracked may have irregular sensor readings (e.g. capacitance, inductance, resistance, voltage, current, wattage, etc. readings associated with the touchscreen). There are different types of touchscreens, and therefore, the way in which damage is detected on a touchscreen (such as a crack or burnt out pixel) may depend on the type of technology used for the touchscreen.

In some examples, the user device may detect touches on a touchscreen based on system-wide averages of sensor readings (e.g. capacitance, resistance, inductance, voltage, currents, etc. readings). In such an example, the user device may be configured to detect areas on a touchscreen that deviate from the system-wide average for a long period of time or some threshold period, such as an hour, twenty minutes, one day, etc. In some example, the system may detect areas of the touchscreen that deviate from the system-wide average when the screen is not being used, such as when the display is turned off on the user device or when the user device is not displaying anything. In this manner, the process reduces false positive detections of damage which may be triggered by normal user use.

In some examples the system may detect irregularities during touchscreen use. For example, some touchscreens, such as projected capacitive touchscreens, have densely packed electrodes that change in capacitance when touched. Other touchscreens may detect changes in resistance, circuit signal (e.g. alternative current (AC), voltage, etc.), or otherwise cause a change in the electronics that the user device is configured to sense to determine a user is interacting with the touchscreen. A finger or stylus will generally affect multiple electrodes, which should cause similar readings for each electrode. However, the touch readings on a cracked portion of a screen from a stylus or finger would be different than an undamaged portion of the screen. Therefore, a dramatically different sensor value in the center of a cluster of electrodes being touched would indicate that there may be damage at that location. Furthermore, if that same electrode continues to exhibit irregular or dramatically different sensor values over multiple touches sensed in the area, the user device would be able to determine that there is damage at that location of the user device. What may be considered dramatically different may depend on the accuracy and sensitivity of the sensor. As such, dramatically different may be a predetermined multiple of the max error of the sensors. In some examples, dramatically different may be based on a multiple of a standard deviation of sensor values when touched. In some examples, the user device may determine that there is damage on a touchscreen after a threshold number of irregular readings are detected for a particular part of the screen. In some examples, the use device may determine there is damage on the touchscreen when a threshold number of irregular readings from one or more particular patterns (e.g. a touch pattern where irregular reading are surrounded by normal readings of a touch activation) are detected. In some examples, there may be a threshold number of activated adjacent electrodes that are activated or percentage of electrodes (or other sensors) within a surrounding area that are activated for the user device to count an irregularity towards a threshold number of irregularity readings to determine that there is damage. Due to the density of electrodes in a touchscreen, it is likely that multiple electrodes will be damaged together. As such, the system may treat connected electrodes with irregular readings as a single entity to determine whether certain electrodes are adjacent or not. For example, if a first electrode is adjacent to a second electrode and both are providing irregular readings, a second electrode that is adjacent to the first electrode but not the second may still be considered as adjacent to the second electrode for purposes of determining whether to count the irregularity toward a threshold irregularity number associated with determining that the device is damaged.

In some examples, how damage is determined for a touchscreen may depend on the exact type of touchscreen used. There are many different types of touchscreens. For example, there are surface acoustic wave touchscreens and surface capacitive touchscreens. These types of touchscreens have sensors on the edges of the touchscreen (surface acoustic wave touchscreens) or on the corners (surface capacitive touchscreens). These types of touchscreens determine the location of a touch based on determining the X and Y location of the finger on the touchscreen as detected by the edge (e.g. disturbed waves caused by an object touching the touchscreen) or corner sensors (e.g. corner capacitance sensors which detect changes in capacitance at the corners when a finger touches the screen). These types of touchscreens may be able to immediately detect damage to a touchscreen as the signals the sensors will receive will be changed by any cracks or damage to the screen without a user touching the touchscreen. Thus, the system may be able to detect damage without any user feedback for certain touchscreens. In some example, process 300 may have operations for detecting the type of touchscreen being used and implement a particular damage recognition operation tailored for the type of touchscreen detected. Detecting the touchscreen may be identified based on user device information, such as make and model, APIs used, type of sensor values received, serial numbers, and/or the like. In some examples the system may map or model the crack of the touch screen based on that above sensor readings.

In some examples, the user device may determine whether there is a damaged pixel. The system may have a sensor to sense whether currents, voltage, or other readings for the pixel change according to the commands to the pixel (e.g. color commands, on, off, brightness, etc.). The system may determine that the pixel is damaged once irregular (e.g. abnormal sensor values) and/or non-responsive (e.g. pixel always on or off) readings associated with the pixel is detected for a threshold period of time.

In some examples, the user device may determine whether the microphone has been damaged. The system may check to see if a signal is being received from the microphone within a threshold period of time. If no signal has been received within the threshold period of time, the system may determine that there has been damage to the microphone.

In some examples, the user device may be able to detect damage to a device based on usage pattern. For example, the home button may have a certain usage frequency when functional. The home button may have a usage frequency of 1-3 presses per 5-minute interval while the screen is on. The user device may be configured to capture these frequencies for use in detecting damage to a particular portion of the user device. For example, if there are 0 home button presses for a threshold number of 5-minute interval while the screen is on, the system may determine that the home button is broken.

In some examples the usage frequency time may be based on longer or shorter time intervals, such as seconds, hours, days, etc. Furthermore, the frequency may be based on other factors other than when the screen is on, such as active use. There may be different expected usage frequencies depending on the application that is being used on the user device, time of day, orientation of the device, etc.

The user device, may detect that one or more usage frequencies for an associated button or portion of a touchscreen has dropped dramatically (e.g. 50%, 70%, or some other predetermined percentage), dropped below a certain number of standard deviations from the average, and/or dropped to zero. In response to detecting that one or more usage frequencies of a part of the user device has dropped below a predetermined level, the user device may determine that that particular part of the user device has been damaged.

In some examples, the user device may provide a way to a user indicate that the user device is damaged and that remediation should be performed. The manner in which a user can indicate damage should be simple and unlikely to be a breaking point. For example, removing the battery from the user device and replacing it. The user device may have a powered memory bit that resets when the battery is removed and indicates to the user device that the battery has been removed. This may be used as an indication that there has been damage to the user device and to perform some form of remediation or damage confirmation checks.

One option is to have the device completely discharge and turn off through use (rather than a power off button) as an indication. This type of indicator would be useful for user devices that do not have removable batteries. Another option would be a settings button. In some examples, the user device may have multiple ways for a user to indicate that the user device is damaged. In this manner, if one way of indicating damage is not possible due to the damage to the phone, another method can be used (e.g. pattern of hardware button presses in case the screen is broken and settings that can be reached though the touchscreen in case the hardware buttons are broken).

In some examples, process 300 may include operation 302 for confirming that the user device is damaged. In this manner, the user device would be able to determine whether the detected damage in operation 301 is a false positive or not. Furthermore, the user device would be able to trouble shoot the damage to ensure there really is some sort of damage.

In some examples, the user device may ask the user whether there has been any damage to the device. The user device may display a text prompt such as "damage to the device has been detected, is the device running smoothly?" and provide instructions for a response indicating whether there has been damage or not (e.g. actuating a hardware or software button/switch).

In some examples, the instructions and manner in which a response can be made to the damage confirmation prompt may be based on the detected damage. For example, if the user device detects that the home button is damaged, the user device may request that the user confirm that the user device has been damaged or not damaged through a touchscreen interface. If the user device detects that the touchscreen is damaged, the user device may, in response, request confirmation through a hardware button, through an undamaged portion of the touchscreen, through voice response, and/or the like.

In some examples, the system may determine, based on the user's response, whether there has been a confirmation that the user device has been damaged or not. In some examples, the user device may consider the lack of a response to be a confirmation of user device damage. This would allow the user device to receive confirmation and implement remediation procedures in cases where the user device is damaged in such a way that a user cannot respond to the prompt.

In some embodiments, process 300 may include operation 303 wherein the user device may perform tests to determine the extent of the damage to the user device. The user device may request the user to perform a series of actions and/or tests for the user device to determine the extent of the damage to the user device. For example, the user device may request the user to perform touch actions on the touchscreen of the user device to detect damage to the touchscreen. For example, the user device may request the user to wipe their finger across the entire screen or wipe in a manner displayed on the screen. The user device may record the sensor readings from the touchscreen to detect irregularities. In some examples, the user device may focus its tests on certain parts of the touchscreen, such as where the damage is detected at operation 301, to determine the extent of the damage. In some examples, the user device may attempt to display on the user device the detected portions of a crack on a touchscreen and request the user to manipulate the displayed image through touch actions to adjust the displayed crack to match the actual crack. In this manner the user device may be able to determine which parts of the sensed cracks are visible or if the crack is larger than what is sensed. This would be possible due to the fact that the touchscreen may still be functional even though there is a crack on the touchscreen.

In some examples, the user device may request the user to press and/or actuate buttons and switches on the user device. In this manner, the user device can check for damage to buttons which might not normally be sensed. The user device may provide options on how to respond in case a button is not responsive. For example, the user device may request the user to press button 1 to check to see if button 1 is working and then button 2 after to indicate that the user has attempted to press button 1.

The user device may request the user to delineate a damaged area on the touchscreen through touch actions. For example, the user device may request the user to outline cracks on the touchscreen using the touchscreen. In some examples, the user device may request that the user delineate the useable portion of the touchscreen using the touchscreen. The user device may prompt the user to touch or wipe across the touchscreen where there is damage and/or where there isn't damage. The user device, based on the touchscreen sensors readings, may determine where the useable and/or unusable portions of the screen is located.

In some embodiments, the user device may test to determine whether the speaker and microphone are working by requesting the user to speak into the microphone or recognize sound from the speakers. In some examples, operations 302 and/or 303 may be omitted, such as when the extent of the damage can be automatically detected at operation 301.

In some examples, process 300 may include operation 304. At operation 304, the system may determine the remediation procedure to be performed based on the damage determined at one or more of operations 301-303. The remediation procedure may be based on the type of damage detected. For example, if it is determined that a hardware button or switch has been damaged, the user device may display a software button on the touchscreen as a replacement. In some examples, the user device may be configured to display the software button with the same likeness as the physical button. For example, if the button is square, then the software button may appear to be square. Furthermore, the software button may be configured to have other similarities to the physical button, such as any symbols or drawings on the button, similar color, and/or the like. The software button may also have other characteristics that are similar to the physical button it is remediating. For example, if the button is a switch, the software button may act like a switch and be actuated similar to a switch (e.g. stay actuated when actuated and slide to actuate). In other situations, a software button may press when actuated (e.g. touching the touchscreen) and depress when not actively actuated (e.g. no longer touching the touchscreen). In some examples, the user device may determine the likeness of the software button based on the type of user device. The user device may identify the make and model of the user device based on identifiers such as hardware numbers, serial numbers, model numbers, system information and/or the like. One the type of device is identified, the system may maintain a database of button images associated with device types for the user device to select as use as a software button replacement.

In some examples, the user device may determine that the damage is to a touchscreen and the remediation procedure is to resize the display to fit the undamaged portions of the touchscreen. In some examples, the user device may resize images based on the undamaged portions of the screen delineated by the user at operation 303. In some examples, the user device may be configured to ignore pixels that the user device has determined as damaged at one or more processes 301-303. For example, pixels that follow along a crack may be turned off to save battery power and the screen and the image that is supposed to be displayed on that pixel may be shifted up or down to the next available or working pixel. In some examples, the user device may reconfigure the image size to fit the largest undamaged portion of the screen and turn off the other portions of the screen.

In some examples, the user device may increase the brightness and/or intensity of pixels along the detected damaged portions of the screen to increase visibility of the image through the distortion caused by the cracks. In some examples, the user device may have mapped the location of the cracks on a touch screen. Touch screens inherently have location capabilities as they map the location of touches on the screen to pixels associated with the display portion of the touch screen. The user device would be able to locate the location of the crack from where the irregular readings are located. Having mapped the location of the crack, the user device may move icons or buttons away from the crack such that a user will be less likely to cut their finger on the cracked screen. Often, user device operating systems have APIs for indicating where an icon can sit on a screen and define actions based on what is sitting in a location on a desktop or screen location. For example, in some user device operating systems, when an icon is placed on top of another icon, a folder is created for both icons. In other examples, an icon placed on top of another icon will move the icon that is underneath. In some examples, when an icon is moved on top of another icon, the icon on top is moved back to its original spot indicating that it cannot be moved to the new location. In some embodiments, the user device, as a remediation to the crack, may implement a place holder, such as an invisible icon, at the location of the crack such that icon cannot be placed over the crack. In this manner, a user would be less likely to cut their finger using the touch screen near the crack. This may also apply to software buttons, such that the user device may actively move buttons away from pixels that are mapped to the locations of cracks on the screen. In some examples, the system may cause other UI elements to avoid damaged regions of the screen, e.g. wireframes, close buttons, actuatable elements, and/or the like.

To simplify calculations by a GPU or CPU, the user device may be configured to create a transform or filter based on the displayable portion of the user device as determined at one or more operations 301-303. The filter and transform would be able to be applied to any image that is to be displayed on the touchscreen to simplify determining how the image will fit to the damaged screen.

In some examples, the user device may determine that the damage is to the speaker or microphone. In case of damage to the speaker, the user device may turn on captions or indicate that sound is unavailable. In case of damage to the microphone, the user device may indicate that the microphone has been damaged. In some cases, the user device may attempt to use its speakers as the microphone as a remediation when the user device is capable of sensing the voltage or current differentials from the speaker device.

At process 305, the user device may implement the remediation procedure determined at operation 304.

Figure 4:
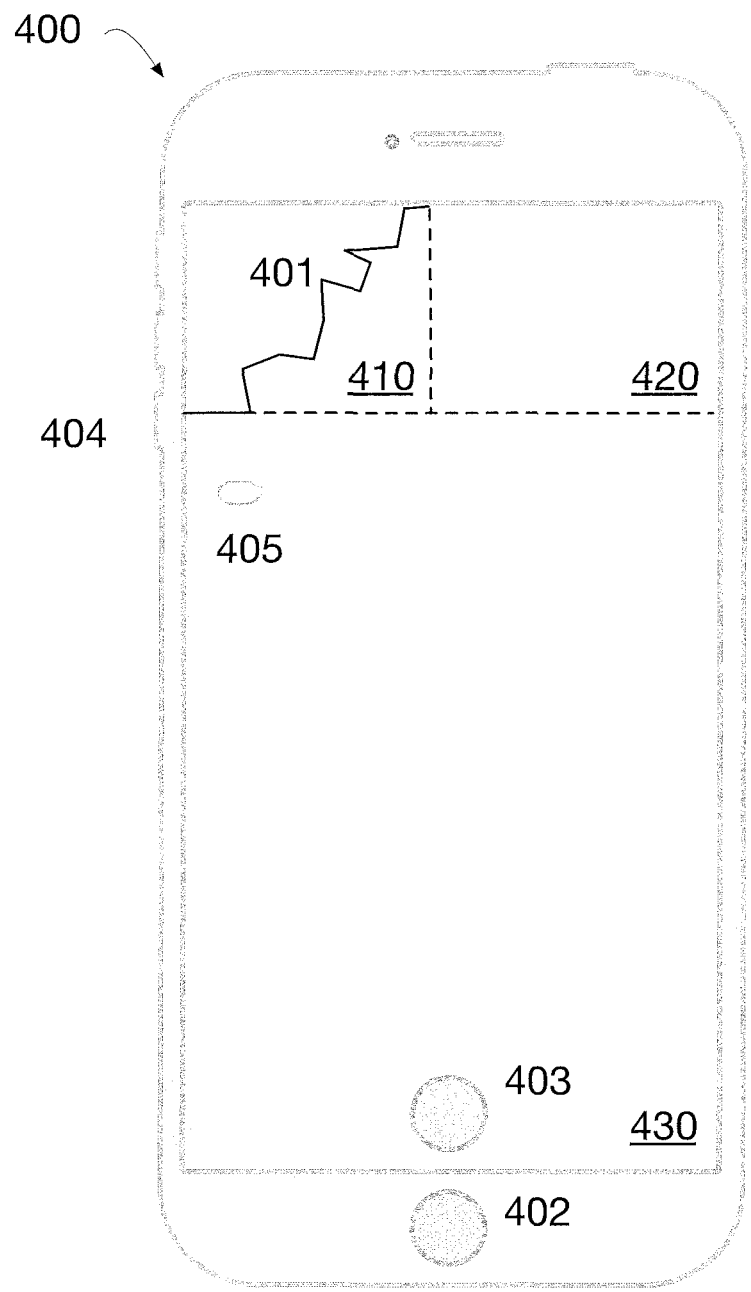
FIG. 4 illustrates and example user device that has been damaged and applying one or more remediation procedures.

FIG. 4 illustrates and example user device 400 that has been damaged and applying one or more remediation procedures. As shown, user device 400 has a crack 401 on the screen in area 410. In some examples, user device 400 may implement a remediation process, such as process 300 of FIG. 3. To remediate crack 401, user device 300 may turn off one or more of the pixels that follow crack 401 as detected by the user device. Furthermore the user device may adjust the image that is being displayed on user device to avoid crack 401. For example, the displayable screen size or pixels may be adjusted such that it is as if the pixels located at or around the crack has been moved to another pixel location, such as an adjacent pixel. The pixel may be shifted to the right, left, up, or down one or more pixels to avoid the damaged pixel. Due to shifting of pixels, the image may not fully fit on the screen and the user device may implement scrolling to view parts of the image.

In some examples, instead of shifting pixels, the user device may downsize or resize the image on a particular row and/or column to fit in a smaller area and then skip the damaged pixels. The system may decide whether to downsize the row or column based on the number of pixels that need to be downsized due to the crack. For example, if there are 20 pixels damaged in the same row but only 3 if done by each column, the user device may determine to downsize the rows to retain the most image quality. Downsizing in this manner would slightly reduce the quality of the image displayed on the user device but help reduce distortion caused by the crack. In some examples, the user device may conduct localized downsizing. For example, downsizing the portion of the image just in area 310. Localized downsizing may depend on the number of pixels that are being removed. For example, downsizing 6 pixels to 1 would cause the image quality to drop significantly more in that localized area than if the local area was determined to be 1000 pixels which is down sized to 995 pixels (assuming 5 pixels have been damaged). In some examples, the downsizing may be conducted over the whole image to fit around the pixels turned off due to crack 301. In this manner, the loss of image quality is shared by the most number of pixels and likely to be the least noticeable.

In some examples, the user device may treat the entire area 310 as damaged and resize the image to fit within areas 330 and 320. However, most applications and displayable objects are created to fit on rectangular displays, in which case, the user device may use area 330 for displaying images and ignore areas 310 and 320. In some examples, the user device may downsize the images to fit area 330. In some examples, the user device may not downsize the image but provide the ability to scroll around the image to view the portions that are not visible due to the smaller display real estate.

Furthermore, as shown in this example, physical button 402 has been damaged on user device 400. In response, user device 400 has remediated the damage by providing software button 403, which has the same look and likeness as physical button 402. Furthermore, the user device may implement haptic feedback with software button 403 to provide a sensation similar to as if a button was being pressed. In some examples, physical button 302 may be a software button on a touchscreen but the touchscreen has been cracked or damaged, and the user device could provide software button 303 as a remediation such that the user won't cut their finger on the crack when using button 302. Additionally, as shown in this example, switch 404 has been damaged and remediated by software switch 405.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, as technology develops different screen types may exist using different touchscreen technology or imaging technology. It is contemplated that the principles disclosed herein could be adapted to apply to new technologies as they develop. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device, comprising:
   a touchscreen;
   a non-transitory memory storing instructions; and
   one or more hardware processors coupled to the non-transitory memory and configured to read the instructions from the non-transitory memory to cause the user device to perform operations comprising:
   determining a type of the touchscreen of the user device based on at least one of: a model of the user device or a device identifier of the user device;
   based at least in part on the determined type of touchscreen, determining, that a location of the touchscreen is damaged; and
   in response to determining the location of the touchscreen is damaged, adjusting a display of content to be outside of the location.

2. The user device of claim 1, wherein adjusting the display of content to be outside of the location comprises changing an aspect ratio.

3. The user device of claim 1, wherein determining that the location of the touchscreen is damaged comprises detecting an unresponsive pixel.

4. The user device of claim 1, wherein determining that the location of the touchscreen is damaged is based at least in part on accelerometer readings.

5. The user device of claim 1, wherein determining that the location of the touchscreen is damaged is based at least in part on touch screen sensor readings.

6. The user device of claim 5, wherein the operations further comprise modeling a crack on the touchscreen based on the touchscreen sensor readings.

7. The user device of claim 1, wherein the damaged location of the touchscreen includes a crack on the touchscreen.

8. The user device of claim 1, wherein the operations further comprise implementing a substitute software button for a physical button in response to determining the physical button is damaged.

9. The user device of claim 8, wherein the substitute software button has a same likeness as the physical button.

10. The user device of claim 9, wherein the substitute software button is operable in a same manner as the physical button.

11. A system, comprising:
a touchscreen;
an accelerometer;
a non-transitory memory storing instructions; and
one or more hardware processors coupled to the non-transitory memory and configured to read the instructions from the non-transitory memory to cause the system to perform operations comprising:
determining a type of the touchscreen of the system based on at least one of:
a model of the system or a device identifier of the system;
based at least in part on the determined type of touchscreen, determining an abnormal physical stress to the system based on one or more readings from the accelerometer;
based on determining the abnormal stress to the system, prompting a user to indicate whether there is a damage to the system;
determining, based on a response to the prompting, that a first feature is unavailable due to the damage; and
remediating the damage by providing an alternative access to the first feature.

12. The system of claim 11, wherein prompting the user comprises requesting the user to perform one or more tests on the system.

13. The system of claim 12, wherein the one or more tests comprises pressing a button on the system and wherein the operations further comprise sensing for a press of the button.

14. The system of claim 11, wherein the first feature is a hardware button and the alternative access is a software button that performs a same function as the hardware button.

15. The system of claim 14, wherein the operations further comprising performing a haptic feedback in response to an actuation of the software button.

16. A smartphone, comprising:
a touchscreen;
a non-transitory memory storing instructions; and
one or more hardware processors coupled to the non-transitory memory and configured to read the instructions from the non-transitory memory to cause the smartphone to perform operations comprising:
determining that the touchscreen has a crack based on sensor readings from the touchscreen;
turning off at least one pixel located at a location of the crack on the touchscreen;
determining an image for display on the touchscreen; and
in response to determining that the touchscreen has the crack, resizing the image for display.

17. The smartphone of claim 16, wherein the operations further comprise:
determining a type of the touchscreen based on a database lookup of device information; and
determining that the touchscreen has additional damage based at least in part on the type of touchscreen.

18. The smartphone of claim 16, wherein the operations further comprise determining an undamaged screen size based on the sensor readings.

19. The smartphone of claim 18, wherein the undamaged screen size is a largest rectangular undamaged portion of the touchscreen.

20. The smartphone of claim 16, wherein the operations further comprise determining a type of the touchscreen based on at least one of: a make and a model of the smartphone or a device identifier of the smartphone, wherein the type of the touchscreen comprises one of a surface acoustic wave touchscreen or a surface capacitive touchscreen.

* * * * *